United States Patent [19]

Morio et al.

[11] 3,921,036

[45] Nov. 18, 1975

[54] ELECTRON BEAM DEFLECTION CIRCUIT

[75] Inventors: Minoru Morio, Kamakura; Yutaka Nakagawa, Tokyo, both of Japan

[73] Assignee: Sony Corporation, Tokyo, Japan

[22] Filed: Jan. 11, 1974

[21] Appl. No.: 432,609

[30] Foreign Application Priority Data

Jan. 19, 1973 Japan .......................... 48-8817[U]

[52] U.S. Cl. .................................................. 315/396

[51] Int. Cl.² .......................................... H01J 29/72

[58] Field of Search ........... 315/396, 397, 403, 406, 315/408–410

[56] References Cited

UNITED STATES PATENTS 3,440,485 4/1969 Nix et al. ............................ 315/397

3,784,857 1/1974 Christopher ........................ 315/396

*Primary Examiner*—T. H. Tubbesing

*Attorney, Agent, or Firm*—Hill, Gross, Simpson, Van Santen, Steadman, Chiara & Simpson

[57] ABSTRACT

A vertical deflection circuit which has an output stage formed in the type of single-ended push-pull amplifier and a voltage supplying circuit with a charge storing device connected between a voltage source and the output stage. The voltage supplying circuit supplies a voltage from the voltage source to the output stage and simultaneously charges the charge storing device during a retrace period and also supplies a voltage lower than the voltage of the voltage source to the output stage by discharging of the charge storing device during a trace period.

8 Claims, 15 Drawing Figures

ELECTRON BEAM DEFLECTION CIRCUIT

BACKGROUND OF THE INVENTION

1. Field of the Invention

This invention relates generally to deflection circuits for deflecting electron beams, and more particularly to an improvement in vertical deflection circuits having an output stage formed in a single-ended push-pull amplifier.

2. Description of the Prior Art

In television receivers and the like which have a cathode ray image reproducing device, vertical and horizontal deflection circuits are employed for deflecting electron beams in the cathode ray image reproducing device to achieve field and line scannings of the electron beams. Various kinds of circuits have previously been proposed as vertical deflection circuits and one of these vertical deflection circuits is a transistorized circuit having an output stage, which supplies a sawtooth wave current to a vertical deflection winding, formed in a type of single-ended push-pull amplifier. Such a transistorized circuit has been often employed because of its advantage of increased efficiency. However, previously proposed vertical deflection circuits having the output stage of single-ended push-pull amplifier type were unable to avoid expending a certain amount of useless power consumption which is essentially caused by their circuit construction, and therefore the efficiency, namely, the ratio between an output power at the vertical deflection winding and the power supplied to the circuit is not increased. Some improved circuits of such a type have also been proposed to diminish the above mentioned useless power consumption, but with such circuits, none seem to have obtained satisfactory results.

OBJECTS AND SUMMARY OF THE INVENTION

An object of the present invention is to provide an improved vertical deflection circuit having an output stage of the single-ended push-pull amplifier type.

Another object of the present invention is to provide a vertical deflection circuit having an output stage of the single-ended push-pull amplifier type which is improved to operate with increased efficiency.

The present invention provides a novel vertical deflection circuit having an output stage of the single-ended push-pull amplifier type which operates from a first operation voltage supplied from a voltage source during a retrace period and from a second operation voltage lower than the first voltage during a trace period, so that output efficiency is increased.

The present invention also provides a novel vertical deflection circuit having an output stage of the single-ended push-pull amplifier type, which includes a power storing circuit which is charged by a voltage source during a retrace period and which is discharged to supply a voltage lower than the voltage of the voltage source to the output stage during a trace period, so as to increase output efficiency of the circuit.

DESCRIPTION OF THE PREFERRED EMBODIMENTS

In order to facilitate a better understanding of the present invention, an example of the prior art deflection circuit with an output stage of the single-ended push-pull amplifier type will be now described with reference to FIGS. 1 and 2.

Figure 1:
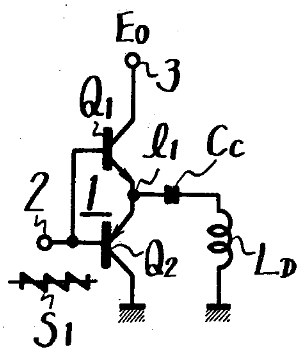
Fig. 1 (PRIOR ART)
FIG. 1 is a schematic circuit diagram showing a prior art deflection circuit with an output stage of a single-ended push-pull amplifier type.

FIG. 1 shows a part of the prior art vertical deflection circuit with an output stage formed in a single-ended push-pull amplifier. In the figure, reference numeral 1 designates a single-ended push-pull amplifier circuit with a pair of transistors $Q_1$ and $Q_2$ forming an output stage. A driving signal $S_1$ of sawtooth wave, which is in synchronism with the vertical period, is supplied to an input terminal 2 which is provided at the base electrodes of the transistors $Q_1$ and $Q_2$ to switch both the transistors. Thus, through a deflection yoke $L_D$, which is connected through a capacitor $C_c$ to a connection point $l_1$ between the emitter electrodes of the transistors $Q_1$ and $Q_2$, a sawtooth wave signal (of current) is generated, as is well known.

Figures 2A, 2B, 2C:
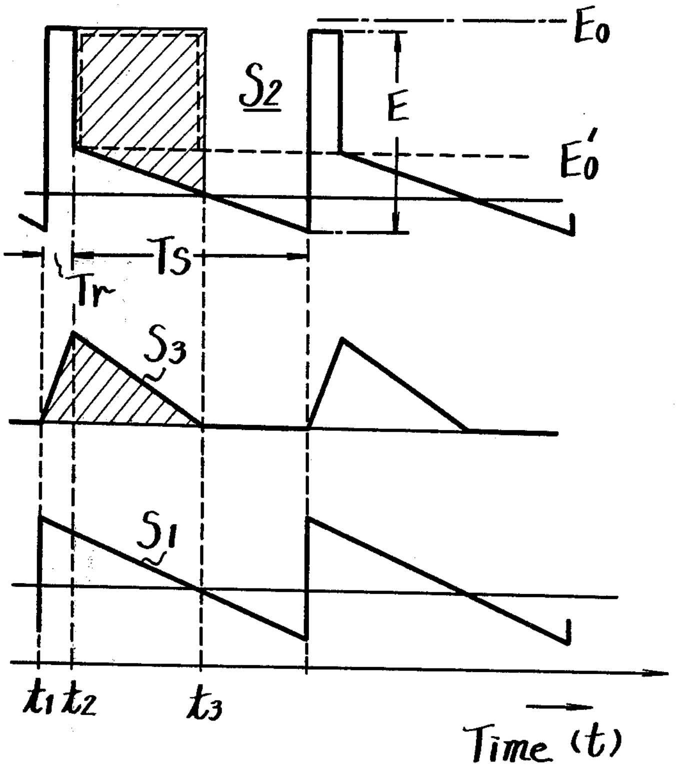
Fig. 2A (PRIOR ART) Fig. 2B Fig. 2C
FIGS. 2A to 2C are schematic waveform diagrams used for explanation of the operation of the circuit shown in FIG. 1.

With such a prior art vertical deflection circuit, if the emitter voltage at the connection point $l_1$ is taken in consideration, it is a pulse like waveform during a retrace period Tr but a voltage waveform which changes to decrease linearly during a trace period Ts as shown by $S_2$ in FIG. 2A, which is obtained at every single field interval. In this case, the maximum signal output voltage E obtained at the emitter electrode of the transistor $Q_1$ is somewhat lower than a power source voltage $E_o$ which is applied to a terminal 3 connected to the collector electrode to the transistor $Q_1$ due to the circuit construction, the saturation voltage of transistor $Q_1$ and for other possible reasons. Further, since the sawtooth wave driving signal $S_1$ shown in FIG. 2C is applied to the base electrode of the transistor $Q_1$, the transistor $Q_1$ is made conductive during the time period between times $t_1$ and $t_3$. Accordingly, if the electric power consumed in the transistor $Q_1$ is taken in account, its voltage component is shown by a trapezoid area as cross-hatched in FIG. 2A. While the current flowing through the transistor $Q_1$ at this time is $\beta$ times the driving signal $S_1$, where $\beta$ is the current gain of the transistor $Q_1$, the current component of the power consumed in transistor $Q_1$ is shown as a current $S_3$ which is approximately the same as the driving signal $S_1$ in waveform, as shown in FIG. 2B by the cross-hatch. As a result, the power consumption $P$ in transistor $Q_1$ is the product of the voltage component shown in FIG. 2A by the cross-hatch and the current component is shown in FIG. 2B by the cross-hatch.

Now, from the operation point of view, the transistor $Q_1$ is made conductive between the times $t_1$ and $t_3$ as shown in FIGS. 2A to 2C. However, the voltage portion surrounded by the dotted line in FIG. 2A does not appear at the emitter electrode of transistor $Q_1$, but is applied across the emitter-collector electrodes of transistor $Q_1$, which above voltage portion is a useless voltage. Thus, the power consumption due to this useless voltage in the transistor $Q_1$ is a useless power consumption and hence the output efficiency of the above prior art vertical deflection circuit is lowered.

As mentioned above, the present invention has as an object a circuit arrangement which will avoid the lowering of output efficiency caused in the prior art vertical deflection circuit and which will increase the output efficiency, and will propose a vertical deflection circuit small in power consumption and simple in circuit construction.

A preferred embodiment of a vertical deflection circuit according to the present invention will be now described with reference to FIG. 3.

Figure 3:
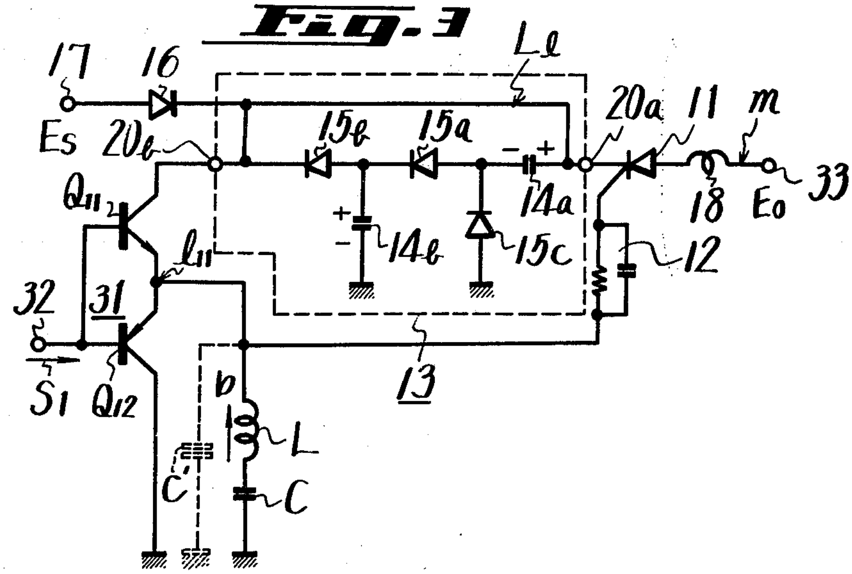
FIG. 3 is a schematic circuit diagram showing one embodiment of deflection circuits according to the present invention.

In the embodiment of FIG. 3, a single-ended push-pull amplifier circuit is shown, which forms an output stage 31, and which consists of a pair of transistors $Q_{11}$ and $Q_{12}$. Since the transistors $Q_{11}$ and $Q_{12}$ are complementary in this embodiment, a common input terminal 32 is provided at the base electrodes of both of the transistors $Q_{11}$ and $Q_{12}$. A driving signal $S_1$ having a sawtooth waveform is applied to the input terminal 32 to make the transistors $Q_{11}$ and $Q_{12}$ conductive and non-conductive, alternately. To a connection point $l_{11}$ between the emitter electrodes of both the transistors $Q_{11}$ and $Q_{12}$, there is connected in series a deflection yoke L and a capacitor C. Thus, a deflection current with a sawtooth waveform flows through the deflection yoke L, which is substantially the same as in the prior art. To a voltage source terminal 33 through a path m, there is connected a control element or switching device 11 such as a gate controlled switch (GCS) transistor, silicon controlled rectifier (SCR), or the like in series so as to intermittently supply a voltage $E_o$ from the voltage source to the output stage 31. The control electrode of the switching device 11 is connected to the connection point $l_{11}$ through a differentiating RC circuit 12, if necessary, so as to be supplied with a pulse voltage generated at the deflection yoke L and hence to be controlled in conduction by the pulse voltage. In the illustrated embodiment, the GCS is employed as the switching device or control element 11.

Between the cathode electrode of GCS 11 and the collector electrode of transistor $Q_{11}$ there is connected an operation voltage generating circuit 13 so as to determine the operating voltage for the output stage 31 of the single-ended push-pull amplifier type during the trace period Ts. The operation voltage generating circuit 13 serves to establish a voltage $(1/n)E_o$ ($n$ being a positive integer), from the voltage $E_o$ of the voltage source. For this purpose, the operation voltage generating circuit 13 may be formed of a plurality of capacitors 14*a*, 14*b*, . . . . connected in series or parallel with one another. In the illustrated embodiment, the operation voltage is selected, as $\frac{1}{2}E_o$, so that only two capacitors 14*a* and 14*b* are used. In the circuit 13, diodes 15*a* and 15*b* are employed for blocking the reverse current. A diode 15*c* is connected to one end of the capacitor 14*a* and a lead wire $L_l$, which is connected in parallel to the series connection of capacitor 14*a* and diodes 15*a* and 15*b*, to form a discharge path for the capacitor 14*a*.

A terminal 17, which is connected to the cathode electrode of the diode 15*b* through a diode 16, is a terminal to which a voltage Es is supplied. The voltage Es is selected lower than the voltage $E_o$ to cause the diode 16 to be in reverse biased condition during the operation of the vertical deflection circuit and hence in the nonconductive state with the result that the terminal 17 is disconnected from the output stage 31 and the circuit 13 to have no effect on the deflection operation. A coil 18, connected to the anode of the GCS 11, is used to make the charging time constant of capacitors 14*a* and 14*b* long during the conductive state of GCS 11. In FIG. 3, reference numerals 20*a* and 20*b* indicate terminals of circuit 13.

The operation of the circuit shown in FIG. 3 will be now described with reference to FIGS. 4A to 4F.

Figures 4A, 4B, 4C, 4D, 4E, 4F:
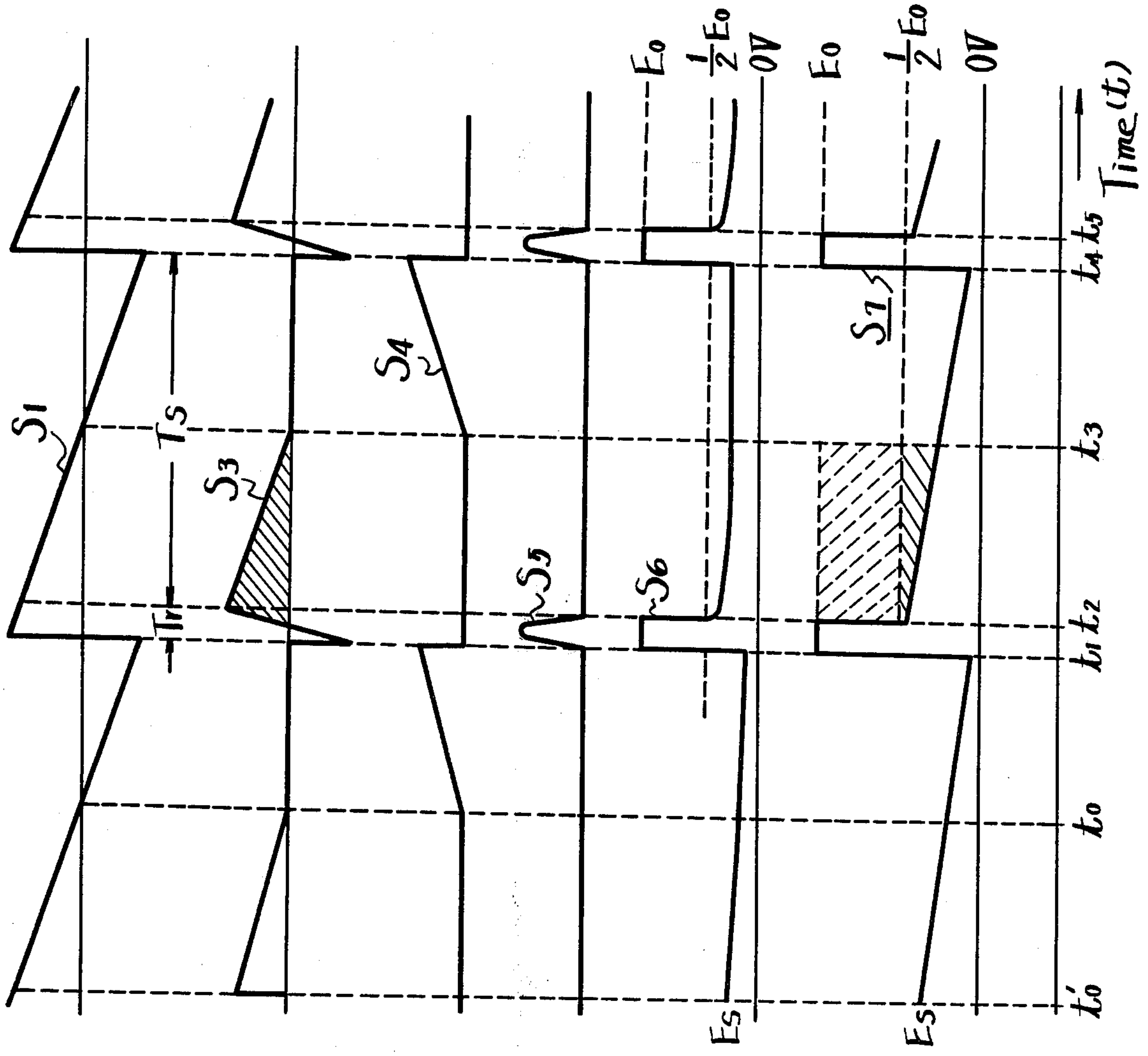
FIGS. 4A to 4F are schematic waveform diagrams used for explanation of the operation of the embodiment of the present invention shown in FIG. 3.

When the driving signal $S_1$ shown in FIG. 4A is supplied to the terminal 32, the transistor $Q_{11}$ is made conductive during the positive interval of driving signal $S_1$ and the transistor $Q_{12}$ is made conductive during the negative interval of driving signal $S_1$. Upon the motive condition of the deflection circuit, the GCS 11 is nonconductive. For example, if the motive voltage Es is supplied to the terminal 17 at a time $t'_o$, since the transistor $Q_{11}$ is conductive, a current $S_3$ in accordance with the driving signal $S_1$, as shown in FIG. 4B, flows through the circuit of transistor $Q_{11}$-deflection yoke L-capacitor C and the capacitor C is charged by this current. As the driving signal $S_1$, becomes negative at a time $t_o$, the transistor $Q_{11}$ becomes nonconductive but the transistor $Q_{12}$ is made conductive. As a result, the charge stored in the capacitor C is discharged through the circuit of transistor $Q_{12}$ and hence a current $S_4$, shown in FIG. 3C, flows through transistor $Q_{12}$ and a current, which is reverse in polarity with respect to that flowing when the transistor $Q_{11}$ is conductive (see arrow *b* in FIG. 3), flows through the deflection yoke L. This current is increased with time lapse.

At a time $t_1$, the transistor $Q_{12}$ is made nonconductive by the driving signal $S_1$ but the transistor $Q_{11}$ is made conductive again by the driving signal $S_1$ and therefore the latter transistor will have the emitter current flow therethrough. However, at this time, reverse current flows through the deflection yoke L, so that the transistor $Q_{11}$ is biased reversely. Accordingly, the current flowing through the deflection yoke L flows to charge a stray capacitor C′ existing in parallel with the deflection yoke L as shown by a dotted line in FIG. 3 and also flows through the transistor $Q_{11}$ reversely. Thus, the emitter voltage of transistor $Q_{11}$ increases abruptly to produce a pulse voltage which is a retrace pulse. The pulse width of the retrace pulse is determined by a resonance circuit formed of the deflection yoke L and the capacitor which is connected equivalently in parallel thereto and includes the stray capacitor C′. That is, the retrace period Tr between the time $t_1$ and a time $t_2$ is determined. Since the pulse voltage is higher than the collector voltage of transistor $Q_{11}$, the pulse voltage is applied through the differentiating circuit 12 to the gate electrode of the GCS 11 to make the same conductive. Thus, the voltage $E_o$ of the voltage source is applied to the collector electrode of transistor $Q_{11}$ to make its collector voltage $E_o$ shown by $S_6$ in FIG. 4E. The capacitors 14*a* and 14*b* are connected in series to the terminal 33 through the GCS 11 and, as a result, each of the capacitors 14*a* and 14*b* is charged up to a voltage $\frac{1}{2}E_o$, respectively, with the polarity as shown in FIG. 3. The retrace pulse voltage rises to the voltage $E_o$, that is, the voltage at the connection point $l_{11}$ becomes $E_o$ as shown by $S_7$ in FIG. 4F. After the capacitors 14*a* and 14*b* are charged as mentioned above, the motive voltage Es is disconnected from the circuit due to the operation of diode 16.

The time interval during which the GCS 11 is conductive exists between the times $t_1$ and $t_2$ during which the retrace pulse voltage is generated. After the time $t_2$, when the emitter voltage of transistor $Q_{11}$ is lowered, the emitter voltage of transistor $Q_{11}$ becomes lower than its collector voltage, and the gate voltage of GCS 11 becomes lower than its cathode voltage with the result that the GCS 11 is made non-conductive and consequently the voltage $E_o$ is cut-off. A waveform $S_5$ shown in FIG. 4D indicates the current flowing through the GCS 11. Since the transistor $Q_{11}$ is conductive during the time interval between the times $t_2$ and a time $t_3$, the voltages ½$E_o$ stored in the capacitors 14*a* and 14*b* respectively are discharged through the loop of the capacitor 14*a* - transistor $Q_{11}$ - deflection yoke L - capacitor C - diode 15*c* - capacitor 14*a* and the loop of the capacitor 14*b* - diode 15*b* - transistor $Q_{11}$ - deflection yoke L - capacitor C - capacitor 14*b*, respectively. In this case, the discharges of capacitors 14*a* and 14*b* are parallel discharges so that a voltage supplied to the collector electrode of the transistor $Q_{11}$ is not the voltage $E_o$ but the charging voltage to the capacitors 14*a* and 14*b*, namely, ½$E_o$. Thus, the collector voltage of the transistor $Q_{11}$ has a waveform shown in FIG. 4E. During the time interval from the time $t_3$ to a time $t_4$ at which the transistor $Q_{11}$ is made conductive again, the transistor $Q_{12}$ is conductive and the above-mentioned discharging paths or loops are not formed with the result that the collector voltage of transistor $Q_{11}$ is held at an almost constant value slightly lower than ½$E_o$.

Even if the GCS 11 is made nonconductive and the supply of the voltage $E_o$ of the voltage source is stopped as described above, the single-ended push-pull amplifier type circuit of the output stage 31 is supplied with the operation voltage signal of approximately ½$E_o$ and hence the voltage $S_7$ at the emitter electrode of the transistor $Q_{11}$, that is, at the connection point $l_{11}$ decreases gradually as shown in FIG. 4F due to the voltage drop caused by the current flowing through the resistor component of deflection yoke L or current $S_3$ flowing through transistor $Q_{11}$.

In this case, if the power consumption P in the transistor $Q_{11}$ is taken into account, its voltage component is substantially shown by a triangular portion by the cross-hatch in FIG. 4F. This voltage component corresponds to the triangular portion of the cross-hatched voltage component of FIG. 2A, which is surrounded by the waveform $S_2$ and the voltage $E'_o$ between the times $t_2$ and $t_3$ in FIG. 2A, in the prior art shown in FIG. 1. Accordingly, it will be easily understood that the power consumption P in the transistor $Q_{11}$ of the invention, which is obtained as the product of the above consumed voltage component and the consumed current component shown in FIG. 4B by the cross-hatch (corresponding to the cross-hatched portion of FIG. 2B), is much reduced as compared with that of the prior art. In other words, with the present invention, the useless voltage component shown by a dotted line hatch in FIG. 4F, which corresponds to the useless voltage component shown by the dotted line block in FIG. 2A of the prior art, is eliminated. As a result, with the present invention the total power consumption can be greatly reduced to improve the output efficiency.

In the embodiment of FIG. 3, the operation voltage for the single-ended push-pull amplifier type circuit 31 is made ½$E_o$ during the trace period by the employment of two capacitors 14*a* and 14*b* in the operation voltage generating circuit 13. However, there is no need for the present invention to be limited to the embodiment of FIG. 3, but, by way of example, n number of capacitors are used to produce an operation voltage of $(1/n)E_o$, in the manner mentioned above. Further, it is effective for narrowing the retrace period Tr without lowering the output efficiency that the operation voltage be made small as compared with the voltage $E_o$ of the voltage source.

Figure 5:
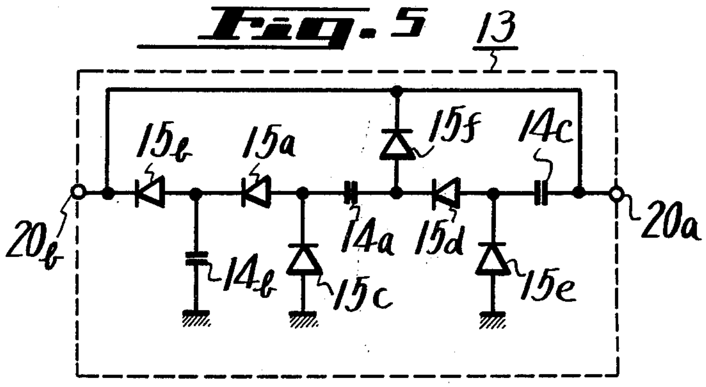
FIG. 5 is a schematic circuit diagram showing a part of a modification of the embodiment of the present invention shown in FIG. 3.

FIG. 5 is a circuit diagram showing another embodiment of the operation voltage generating circuit 13 in which three capacitors 14*a*, 14*b* and 14*c* are used.

In the embodiment of FIG. 5, diodes 15*b*, 15*c*, 15*e* and 15*f* serve for forming the discharge path of the capacitors, and diodes 15*a* and 15*d* serve for blocking the reverse current. In this case, the voltage of ⅓$E_o$ is stored in each of capacitors 14*a* to 14*c*, respectively. The detailed description on this embodiment will be omitted because it may be apparent to one skilled in the art.

Figure 6:
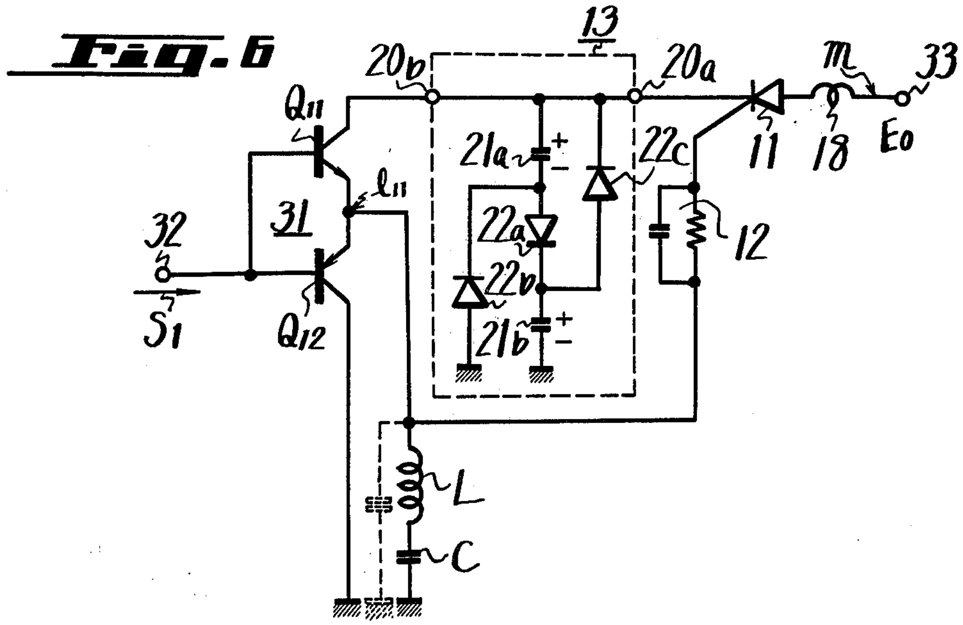
FIGS. 6 and 7 are schematic circuit diagrams showing other embodiments of deflection circuits according to the present invention.

FIG. 6 is a circuit diagram for showing another embodiment of the vertical deflection circuit according to the present invention in which the same reference numerals and symbols as those used in FIG. 3 indicate the same elements.

In the embodiment of FIG. 6, the operation voltage generating circuit 13, which supplies the operation voltage to the single-ended push-pull amplifier type circuit forming the output stage 31, is formed as follows. A series connection of a capacitor 21*a*, a diode 22*a* and a capacitor 21*b* is provided in parallel with the transistors $Q_{11}$ and $Q_{12}$, which form the single-ended push-pull amplifier type circuit. A diode 22*b* is connected in parallel to the series connection of the diode 22*a* and capacitor 21*b*, and a diode 22*c* is connected in parallel to the series connection of the capacitor 21*a* and diode 22*a*. The above connections are connected to the GCS 11 and the collector electrode of transistor $Q_{11}$ through the terminals 20*a* and 20*b*, respectively.

In this embodiment, the diode 22*a* serves to form the charging path for the capacitors 21*a* and 21*b*, while the diodes 22*b* and 22*c* serve to form the discharging paths for charges stored in the capacitors 21*a* and 21*b*, respectively. The motive circuit shown in FIG. 3 is omitted in FIG. 6.

The operation of the embodiment shown in FIG. 6 will be now described. In this embodiment, the retrace pulse is generated at the connection point $l_{11}$ and the GCS 11 is made conductive and nonconductive in accordance with the retrace pulse, as in the case of the embodiment shown in FIG. 3. During the retrace period Tr or during the time interval in which the GCS 11 is conductive, the terminal 20*a* is supplied with the voltage $E_o$ of the voltage source from the terminal 33, and hence the output stage 31 is supplied with the voltage $E_o$ through the terminal 20*b* and the capacitors 21*a* and 21*b* are charged with the polarity shown in FIG. 6 and their terminal voltages become ½$E_o$, respectively. While, during the trace period Ts or the time interval in which the GCS 11 is made nonconductive, the voltage $E_o$ is not supplied to the terminal 20*a*, but the voltage ½$E_o$ stored in the capacitors 21*a* and 21*b* is supplied to the output stage 31. That is, the charge stored in the capacitor 21*a* is discharged through the closed path of the capacitor 21*a* - transistor $Q_{11}$ - deflection yoke L - capacitor C - diode 22*b* - capacitor 21*a* and the charge stored in the capacitor 21*b* is discharged through the closed path of the capacitor 21*b* - diode 22*c* - transistor $Q_{11}$ - deflection yoke L - capacitor C - capacitor 21*b*, respectively, to supply the voltage $½E_o$ to the collector electrode of transistor $Q_{11}$ through the terminal 20*b*. As a result, it will be easily understood that the embodiment of FIG. 6 achieves the deflection operation and improves the output efficiency like the embodiment of FIG. 3. In this case, it is of course possible that n number of capacitors connected in series are used in the circuit 13 to make the operation voltage of $(1/n)E_o$ during the trace period.

Figure 7:
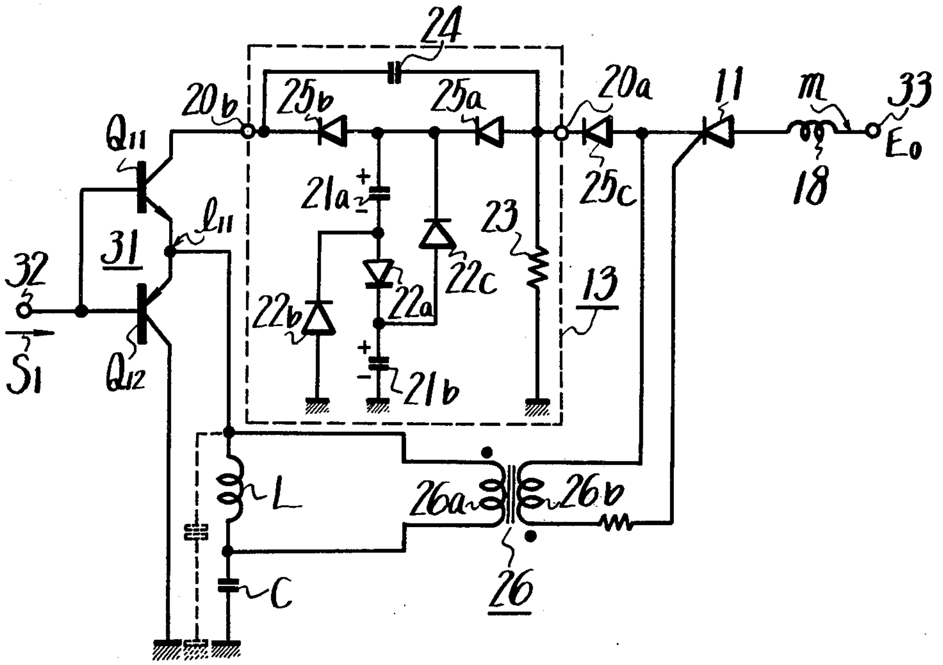

FIG. 7 is a circuit diagram for showing a further embodiment of the invention which uses $(1/n)E_o$ (in the illustrated embodiment, $½E_o$) as the operation voltage during the trace period Ts and can make the operation voltage during the retrace period Tr higher than the voltage $E_o$. In this embodiment, of course, only one voltage source is employed.

The operation voltage generating circuit 13 used in this embodiment is essentially identical to that used in the embodiment of FIG. 6, so that its corresponding elements are shown with the corresponding numerals, and the reference numerals identical to those of FIG. 6 designate the same elements.

Figure 8:
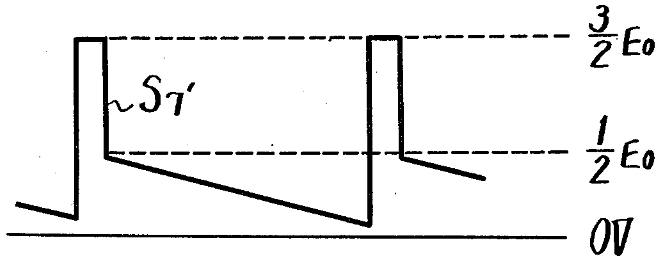
FIG. 8 is a schematic waveform diagram used for explanation of the operation of the embodiment of the present invention shown in FIG. 7.

In FIG. 7, reference numerals 25*a* and 25*b* represent diodes for blocking the reverse current, and 25*c* is a diode for blocking the reverse current also. A capacitor 24 is connected in parallel to the series connection of diodes 25*a* and 25*b* to superpose the charted voltage in the capacitor 24 onto the voltage $E_o$ of the voltage source during the retrace period Tr. That is, the voltage $½E_o$ charged in the capacitors 21*a* and 21*b* during the retrace period Tr are discharged through the transistor $Q_{11}$ during the trace period Ts and also through the series connection of the capacitor 24 and a resistor 23 so that the capacitor 24 is charged to $½E_o$. The charge stored in the capacitor 24 is discharged through the transistor $Q_{11}$ during the retrace period Tr, so that the operation voltage supplied to the collector electrode of transistor $Q_{11}$ during the retrace period Tr approximately becomes the voltage $E_o$ of the voltage source plus the charged voltage $½E_o$ in the capacitor 24 (i.e., $E_o + ½E = 3/2\ E_o$). The voltage waveform at the connection point $l_{11}$ is shown $S'_7$ in FIG. 8. Thus, it will be understood that the embodiment of FIG. 7 can improve the output efficiency.

Further, in the embodiment of FIG. 7, the gate electrode of the GCS 11 is supplied with the control voltage through a transformer 26, which is the difference between the embodiments of FIGS. 6 and 7. The transformer 26 has primary and secondary windings 26*a* annd 26*b*, the primary winding 26*a* being connected across the deflection yoke L, while the secondary winding 26*b* being connected between the gate and cathode electrodes of the GCS 11. In this case, it should be noted that the transformer 26 is only an example of means for applying the control voltage to the gate electrode of the GCS 11.

As described above, with the present invention, the output efficiency is greatly improved with respect to the prior art with a simple circuit construction and with only one operation voltage source, and accordingly, a superior vertical deflection operation can be attained with relatively small power consumption. Further, the retrace period can be shortened without lowering the output efficiency.

In the above embodiments of the present invention, the GCS is used mainly as the switching element or device 11, but the other switching element such as a transistor or the like can be, of course, used, as mentioned previously, and the retrace pulse produced at the connection point $l_{11}$ is utilized as the signal for controlling the switching element 11 but it is, of course, possible to use other signals which may change in accordance with the trace and retrace periods.

It may be apparent to those skilled in the art that many modifications and variations could be effected without departing from the spirit and scope of the novel concepts of the present invention.

We claim as our invention:

1. A deflection circuit comprising:

a. an output circuit including a pair of transistors connected in a single-ended push-pull amplifier array and a deflection coil connected to the output end of said pair of transistors, said deflection coil being supplied with a deflection current in trace and retrace periods;

b. a voltage terminal provided to be connected to a voltage source;

c. switch means connected to said voltage terminal;

d. circuit means having charge storing means and connected between one end of said output circuit and said switch, said circuit means supplying a first voltage to said output circuit and simultaneously charging said charge storing means during the retrace period and supplying a second voltage lower than said first voltage to said output circuit by the discharging of said charge storing means during the trace period; and e. control means for controlling the conductivity of said switch means in response to the turning of the period between the trace and retrace periods.

2. A deflection circuit according to claim 1, wherein said circuit means comprises a voltage supplying path for supplying the voltage of said voltage source to said output circuit, plural capacitors, first connecting means for making a series connection of said plural capacitors connected to said voltage supplying path to charge the series connnected plural capacitors by said voltage source during the retrace period and second connecting means for connecting each of said plural capacitors to said one end of said output circuit with respective paths parallel to each other to make each of said capacitors discharge toward said output circuit during the trace period.

3. A deflection circuit according to claim 2, wherein said first connecting means includes at least one unidirectional element connected between two of said plural capacitors, and said second connecting means includes plural additional unidirectional elements each connected to each of said plural capacitors to make plural series paths connected to said one end of said output circuit in parallel to each other.

4. A deflection circuit according to claim 3, wherein said circuit means further comprises an additional capacitor connected between said switch and said one end of said output circuit, an impedance element connected to a junction between one end of said additional capacitor and said switch, and a further additional unidirectional element provided in said voltage supplying path.

5. A deflection circuit according to claim 1, wherein said control means comprises means for supplying a control signal which varies in accordance with the trace and retrace periods to said switch means so as to make said switch means nonconductive during the trace period and conductive during the retrace period.

6. A deflection circuit according to claim 5, wherein said control means further comprises means for producing said control signal in response to a pulse obtained at the output end of said couple of transistors.

7. A deflection circuit comprising:

a. an output circuit including a pair of transistors connected in a single-ended push-pull amplifier array and a deflection coil connected to the output end of said pair of transistors, said deflection coil being supplied with a deflection current in trace and retrace periods;

b. a voltage terminal provided to be connected to a voltage source;

c. switch means with one end connected to said voltage terminal;

d. circuit means comprising a connecting path connecting the other end of said switch to one end of said output circuit, a series connection of a first capacitor, a first diode and a second capacitor, one end of said series connection being connected to said connecting path, a second diode connected across the series connection of said first capacitor and said first diode and a third diode connected across the series connection of said first diode and said second capacitor; and e. control means for controlling the conductivity of said switch means in response to the turning of the period between the trace and retrace periods.

8. A deflection circuit according to claim 7, wherein said switch means has a control terminal and said control means is connected between said output end of said pair of transistors and said control terminal.

* * * * *